June 14, 1966  G. P. LAMPSON  3,256,152
CONCENTRATION AND PURIFICATION OF INTERFERONS, VIRAL INHIBITING
SUBSTANCES (VIS), VIRAL INHIBITING FACTORS (VIF), OR VIRAL
INHIBITORY MATERIAL
Filed June 14, 1965
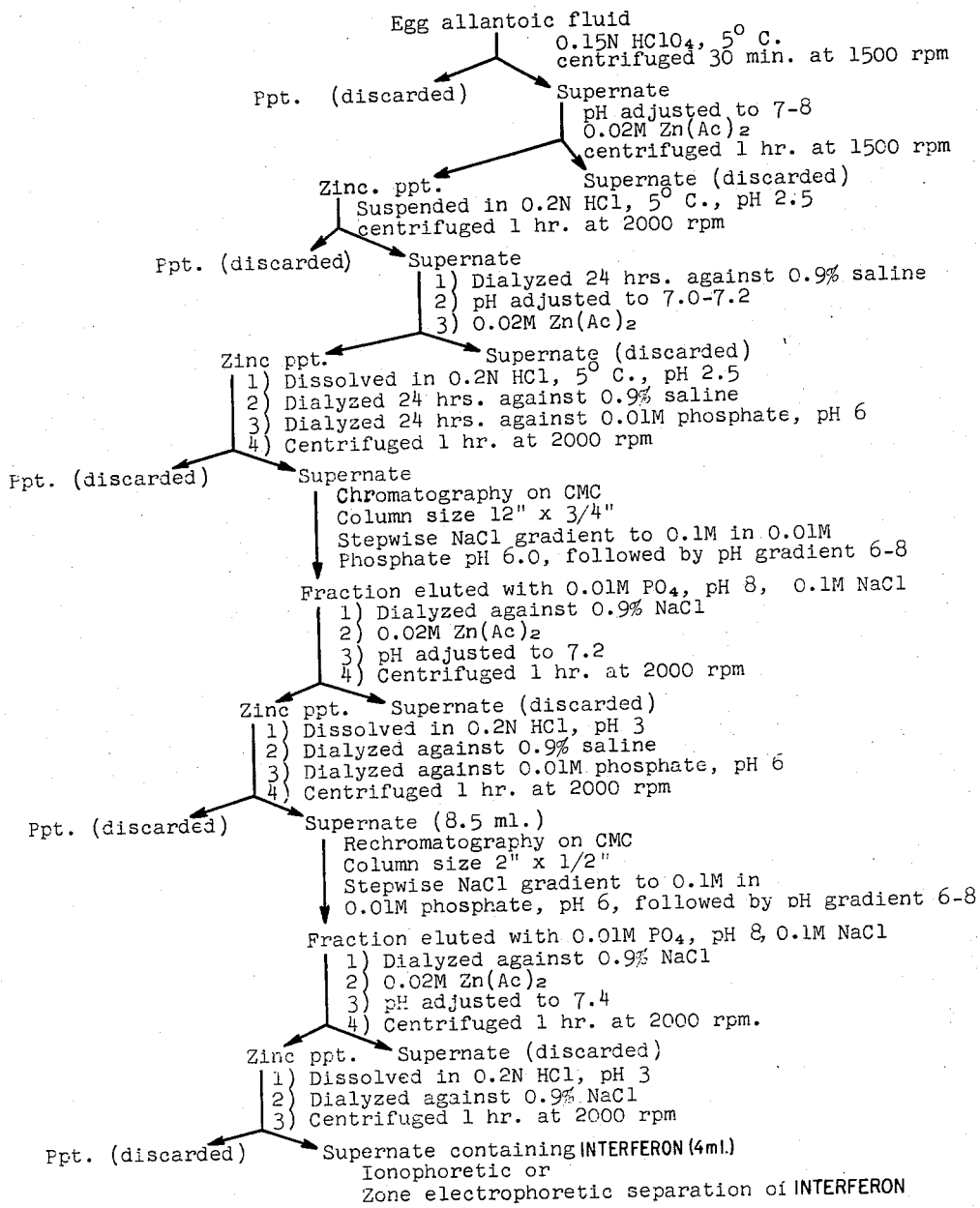
*INVENTOR.*
GEORGE P. LAMPSON

United States Patent Office 3,256,152
Patented June 14, 1966

3,256,152
CONCENTRATION AND PURIFICATION OF INTERFERONS, VIRAL INHIBITING SUBSTANCES (VIS), VIRAL INHIBITING FACTORS (VIF), OR VIRAL INHIBITORY MATERIAL
George P. Lampson, Hatfield, Pa., assignor to Merck & Co., Inc., Rahway, N.J., a corporation of New Jersey
Filed June 14, 1965, Ser. No. 463,907
16 Claims. (Cl. 167—78)

This application is a continuation-in-part of my U.S. applications, Serial No. 384,749 filed July 23, 1964 (now abandoned), which is a continuation-in-part of application, Serial No. 244,222 filed December 12, 1962 (now abandoned), which in turn was a continuation-in-part of application Serial No. 186,133 filed April 9, 1962 (now abandoned).

This invention is concerned with the concentration and purification of viral inhibiting substances (VIS), which are art recognized by the terms interferons, viral inhibiting factors (VIF), and viral inhibitory material, all of said terms being synonymous. In this specification and claims the term interferons shall be used and shall be understood to apply to the same active principle identified by the various terms employed in the prior art. The invention more particularly is concerned with the concentration and purification of interferons from fluids containing these active substances.

The process of this invention can be used to concentrate and purify interferons which had been produced by cells cultured in vitro or by host cells in situ after their exposure to foreign nucleic acids whether from viral, animal or microbial sources but particularly from infective or noninfective viruses which generally induce the synthesis of larger quantities of interferon. Crude interferon-containing fluids can be harvested from such treated systems, and the interferons separated therefrom by the method of this invention.

Representative systems known to induce the synthesis of interferon are identified in Table I. Each of these systems can be used to obtain the crude harvest fluid from which the interferon component can be concentrated and purified by the process of this invention.

TABLE I.—SUMMARY OF INTERFERON SYSTEMS

| Interferon-Producing System | | | Interferon-Testing System | | Source of Data |
|---|---|---|---|---|---|
| Type of Virus | Active or Method of Inactivation | Cell, Tissue or Host | Test Cell, Tissue or Host | Challenge Virus | |
| Yellow Fever 17 DD High Strain. | Active | Chick embryo | Chick embryo | Asibi; West Nile | Lennett et al., J. Exp. Med. 83: 195 (1946). |
| Influenza Type A (MEL, PRs). | Heat; ultraviolet rays | Chick chorioallantoic membrane, in vitro and in ovo. | Chorioallantoic membrane, in vitro; rabbit, intradermal. | MEL; PRs; Sendai; Newcastle disease; vaccinia. | Isaacs et al., Proc. Roy. Soc., London, s.B. 147: 258 (1957). Isaacs et al., Proc. Roy. Soc., London, s.B. 147: 268 (1957). Nagano, Y., et al., Compt. rend. Soc. de biol. 154: 2166 (1960). Burke et al., Brit. J. Exper. Path. 39: 452 (1958). |
| | | | Chorioallantoic membrane, in ovo. | Vaccinia; cowpox | Isaacs et al., Brit. J. Exper. Path. 39: 447 (1958). |
| Influenza Type A (MEL)· Sendai. | Ultraviolet rays | Monkey-kidney cell culture. | Chorioallantoic membrane, in vitro. | MEL | Burke and Isaacs, Brit. J. Exper. Path. 39: 452 (1958). |
| Fowl plague; Newcastle disease; influenza B (Lee). | do | Chick chorioallantoic membrane, in vitro. | do | Influenza | Burke and Isaacs, Brit. J. Exper. Path. ibid. |
| Influenza Type A | Active | do | do | do | Burke and Isaacs, Brit. J. Exper. Path. ibid. |
| Vaccinia | do | Rabbit skin and rabbit testes in vivo. | Rabbit skin, in vivo | Vaccinia | Nagano and Kojima, Compt. rend. Soc. de biol. 152: 1627 (1958). |
| Influenza Type A (Kunz). | do | Calf-kidney cell culture; chorioallantoic membrane, in vitro. | Calf-kidney cell culture; chorioallantoic membrane, in vitro. | Sendai | Tyrell, Nature (London) 184 (Supp. 7): 452 (1959). |
| Influenza Type A (MEL). | Ultraviolet rays | Rabbit-kidney cell culture. | Rabbit skin, in vivo | Vaccinia | Isaacs and Westwood, Lancet 2: 324 (1959). |
| Influenza Type A (MEL). | do | Chorioallantoic membrane, in vitro. | Chick cell culture | West Nile; Bunyamwera; Western equine encephalomyelitis. | Porterfield, Lancet 2: 326, (1959). Isaacs and Westwood, Nature (London) 184 (Supp. 1): 1232 (1959). |
| Poliovirus Type 2 (RMC). | Active | Human amnion; kidney cell culture. | Human amnion; kidney cell culture. | Polioviruses Type 1, 2 and 3; ECHO Type 9; vaccinia; herpes simplex; Sindbis. | Ho and Enders, Proc. Nat. Acad. Sc. 45: 385 (1959). Idem. Virology 9: 446 (1959). |
| Influenza Type A (WS) | do | Intrallantoic, in ovo | Chick-embryo cell culture. | Eastern equine encephalomyelitis. | Wagner, Bact. Rev. 24: 151 (1960). |
| Newcastle disease; mumps; WS influenza; Sendai. | Ultraviolet rays | MCN cell culture | MCN; human kidney; rabbit kidney; mouse-embryo cell culture. | Vesicular stomatitis; influenza Type A; Sendai. | Henle et al., J. Exper. Med. 110: 525 (1959). |
| Mumps | do | Mouse-fibroblast cell culture. | MCN; mouse fibroblast cell culture. | Vesicular stomatitis | Henle et al., J. Exper. Med. ibid. |
| MCN-mumps [1] | Active | MCN-mumps cell culture. | MCN | do | Henle et al., J. Exper. Med. ibid. |
| HeLa-RMC [1] | do | HeLa-RMC cell culture. | Human-kidney and amnion cell culture. | Poliovirus Type 1 | Ho and Enders, Virology 9: 446 (1959). |
| Vesicular stomatitis | do | Chick-embryo cell culture. | Chick-embryo cell culture. | Vesicular stomatitis | Cooper and Bellett, J. Gen. Microbiol. 21: 485 (1959). Bellett and Cooper, J. Gen. Microbiol. 21: 498 (1959). |
| Poliovirus Type 1, 2 and 3. | + Formalin | Human-amnion cell culture. | Human-amnion cell culture. | Poliovirus Type 1, 2 and 3. | Alivisatos and Edipidis, Ztschr. f. Immunitatsforsch. u. exper. Therap. 119: 344 (1960). |

TABLE I.—SUMMARY OF INTERFERON SYSTEMS—Continued

| Interferon-Producing System | | | Interferon-Testing System | | Source of Data |
|---|---|---|---|---|---|
| Type of Virus | Active or Method of Inactivation | Cell, Tissue or Host | Test Cell, Tissue or Host | Challenge Virus | |
| Parainfluenza Type 3 | Active | KB cell culture | Human-amnion cell culture. | Poliovirus Type 2 | Chany, Compt. rend. Acad. d. sc. 250: 3903 (1960). Idem. Virology 13: 485 (1961). |
| Influenza Type A (PR8) | ____do____ | Mouse lung, in vivo | Mouse-embryo cell culture; mice intraperitoneally. | Encephalomyocarditis; polyoma; Bunyamwera. | Isaacs and Hitchcock, Lancet 2: 69 (1960). Hitchcock and Isaacs, Brit. M. J. 2: 1268 (1960). Allison, Virology 15: 47 (1961). |
| Mumps | Ultraviolet rays | HeLa-cell culture | HeLa-cell culture | Piliovirus Type 1 | Cantell, Arch. f. d. ges. Virusforsch. 10: 510 (1960). |
| Tick-borne encephalitis | Active | Chick-embryo cell culture. | Duck-embryo cell culture. | Western equine encephalomyelitis. | Vilcek, Nature (London) 187: 73 (1960). |
| Mumps | Ultraviolet rays | Rabbit-kidney cell culture. | Rabbit eyes | Vaccinia | Cantell and Tommila, Lancet 2: 682 (1960). |
| Foot-and-mouth disease (Type O). | Active | Calf-kidney cell culture. | Foot-and-mouth disease (Type A5). | Calf-kidney cell culture. | Dinter, Acta path. et microbiol. Scandinav. 49: 270 (1960). |
| O'Nyong-nyong | ____do____ | Adult mouse brain, in vivo. | Mouse fibroblast | Encephalomyocarditis. | Hitchcock and Porterfield, Virology 13: 363 (1961). |
| Sindbis | ____do____ | Chick-embryo cell culture. | Chick-embryo cell culture. | Vesicular stomatitis | Ho, Proc. Soc. Exper. Biol and Med. 107: 639 (1961). Idem. J. Immunol. (in press). |
| Mayaro | ____do____ | ____do____ | ____do____ | Sindbis | Henderson and Taylor, Virology 13: 477 (1961). |
| Measles | ____do____ | Human-amnion cell culture. | Human-amnion cell culture. | ____do____ | De Maeyer and Enders, Proc. Soc. Exper. Biol. and Med. 107: 573 (1961). |
| Influenza Type A (MEL). | Ultraviolet rays | Human-anion, rhesus and cynomolgus-monkey-kidney, chick-fibroblast and rabbit-kidney cell culture. | Rabbit skin and cynomolgus monkey skin in vivo. | Vaccinia | Andrews, Brit. M. J. 1: 1728 (1961). |
| Polyoma | Active | Mouse-fibroblast cell culture. | Mouse-fibroblast cell culture. | Encephalomyocarditis. | Allison, Virology 15: 47 (1961). |
| Influenza | Ultraviolet rays | Chorioallantoic membrane, in vitro. | Chick-embryo cell culture. | Chikungunya and other Group A arbor viruses NDV. | Isaacs, Baron, Virology 14: 450 (1961); Idem., Virology 14: 444 (1961). |
| Influenza Type A (Kunz). | Active | Human-adult-thyroid-gland, embryo-lung and embryo-kidney cell culture. | Human-thyroid-gland and calf-kidney cell culture. | ECHO Type II; Sendai. | Sutton and Tyrrell, Brit. J. Exper. Path. 42: 99 (1961). |
| West Nile | ____do____ | Adult mice, intracerebrally. | L-cell culture | Mengo | Vainio et al, Virology 14: 385 (1961). |
| Sendai | ____do____ | Human-amnion cell culture. | Human-amnion cell culture. | Sindbis | Gresser, Proc. Soc. Exper. Biol. and Med. 108: 303 (1961). |
| Do | ____do____ | Human leukocytes | ____do____ | ____do____ | Gresser, Proc. Soc. Exper. Biol. and Med. 108: 799 (1961). |
| Vaccinia | Active and ultraviolet rays. | Mouse-embryo-cell lines (3B, ME 29) and primary mouse-embryo cell culture. | Al mouse-cell lines | Vaccinia; Sindbis; encephalomyo carditis; herpes simplex; eastern equine encephalomyelitis; vesicular stomatitis. | Glasgow and Habel, J. Exper. Med. 115: 503 (1962). |
| DA myxovirus | Heat; ultraviolet rays | Monkey-kidney cell culture. | Monkey-kidney cell culture. | DA myxovirus | Hsiung, Proc. Soc. Exper. Biol. and Med. 108: 357 (1962). |

[1] Interferon derived from persistently infected cell line.

It was discovered as a feature of this invention that interferons prepared by the systems identified in Table I or by other systems known to induce the synthesis of interferon can be separated in high concentration from the crude harvest fluids thus obtained by first adding a protein precipitating agent to remove virus and inactive proteins from the interferon-containing fluid and then precipitating interferon from the supernate by the addition of a heavy metal salt at a pH between about 6–8. A very substantial concentration of interferon thus is obtained and the active material can be used in this form as a test agent or as a viral inhibiting substance for the purposes hereinafter described.

It was also found as another feature of this invention that substantial purification of interferon can be obtained by chromatographing the above obtained concentrated interferon on a carboxylic cation exchange resin and then eluting the active material by a continuous gradient or preferably a stepwise gradient using an aqueous acetate or phosphate buffer as the eluant, which gives up to about 2,000-fold concentration of interferon with a purification factor of about 1700-fold depending upon the ratio of impurities to active material. Further purification and concentration can be effected by again coprecipitating interferon with a heavy metal salt as described above.

The high concentration and purification factors mentioned above (and also to be referred to in the following discussion) are obtained when the starting fluid contains a very large amount of non-interferon material, as is contained in the interferon-containing allantoic fluids. However, when concentrating interferons from fluids containing markedly smaller quantities of impurities, as when using interferon-containing tissue culture fluids, the concentration and purification factors will be proportionately smaller.

A major portion of residual impurity that may still be associated with the interferon after the above steps have been carried out can be removed either by ionophoresis (suitable for small quantities or to detect the presence of residual impurities) or by zone electrophoresis (especially suitable when larger quantities of highly concentrated and purified interferon-containing materials are involved).

A crude harvest fluid containing interferon can be prepared by any well-known method, such as any of the methods described in the papers identified in Table I, and the active substance then can be concentrated and purified by the novel method of this invention. Two systems generally are used to induce the elaboration of interferon, either by growing the interferon inducing agent in an embryonated egg or by growing the interferon inducing agent in tissue culture. Representative examples of these two systems are described below as illustrative of those methods suitable to prepare crude harvest fluids containing an interferon.

An interferon-containing allantoic fluid can be prepared using embryonated eggs, advantageously hens' eggs, which have been incubated for 9 to 12 days. The eggs are infected allantoically with live or inactivated virus especially RNA or DNA virus, advantageously by injecting in about a 0.20 ml. inoculum dose between about $10^{3.50}$ to $10^{5.50}$, but preferably $10^{4.50}$ $EID_{50}$ (eggs infectious doses 50) of virus. Influenza virus is particularly suitable for the preparation of an interferon in this system.

The infected eggs then are incubated for at least 72 hours, but preferably for 96 and at most 120 hours, at 36-37° C. after which the eggs are chilled and the allantoic fluid containing interferon is withdrawn.

Other live or inactivated viruses can be used in place of influenza virus mentioned above including especially measles virus, herpes simplex, vaccinia virus, Newcastle disease virus, encephalomyelitis, yellow fever and the like.

An interferon-containing tissue culture filtrate (TCF) is prepared by inoculating the interferon inducing agent such as a live or inactivated virus, into tissue culture and incubating until maximum production of interferon has been induced. When using live organisms maximum interferon production generally is reached at an advanced state of virus growth which can be determined by observing cytopathogenic changes in the tissue culture cells. When using inactivated organisms, maximum interferon production is determined by testing small samples of the tissue culture fluid. At the end of the interferon production period, the tissue culture filtrate is harvested by conventional methods.

The tissue cultures are prepared by well known methods using tissues that are conventionally employed for this purpose including mouse embryo fibroblasts or lung tissue, chick embryo fibroblast cells or chorioallantoic membrane, monkey kidney tissue, hamster kidney or embryonic tissue, rabbit skin, testes or kidney, calf kidney, L cells, human embryonic lung and kidney tissue, human amnion and the like.

Live herpes simplex virus is particularly useful in the production of an interferon when grown in tissue culture as described above. Other virus or interferon inducing agent can and have been used, however, for this purpose including chickungunya, $SV_{40}$, rubella, measles, mumps, parainfluenza virus (types 1, 2, 3), influenza viruses, polyoma, vaccinia, foot and mouth disease virus, eastern and western encephalomyelitis virus, poliomyelitis virus, Newcastle disease virus, adenovirus, rickettsia, yellow fever and the like.

Interferon can be concentrated and purified from the crude harvest fluid obtained by the egg culture or tissue culture procedures of the prior art by the process of my invention by adding to the interferon-containing fluid a protein precipitating agent, such as perchloric acid, trichloracetic acid, sulfosalicylic acid, tetrametaphosphate and the like to precipitate virus (for example, the virus inoculant) and a large amount of inactive protein. The crude harvest is maintained at a temperature between 0° to 30° C., but preferably between 0° to 5° C., during the addition of the protein precipitating agent, and sufficient protein precipitating agent is added to give a final concentration of between 1 to 3%.

The interferon, which is stable at low pH, remains in the supernate and can be precipitated therefrom by adjusting the pH to between 6-8 but preferably between 7-8 with a strong base, advantageously sodium or potassium hydroxide, and then adding a solution of a heavy metal salt to a concentration of between about 5 to 50 millimolar, advantageously between 10 to 20 millimolar. Heavy metal salts which are especially useful in precipitating the interferon are cobalt, zinc, calicum, mercury, strontium, barium and the like halides of salts of an organic acid, and in particular the cobalt, zinc, calcium, mercury, strontium or barium acetates, glycinates, lactates, propionates, or chlorides. For all practical purposes, zinc acetate can be used as it is readily available and quite suitable as a precipitant for interferons.

The heavy metal salt precipitate containing the interferon is removed preferably by centrifugation or other mechanical means. The pellet obtained then is stirred at 0-5° C. and treated either with sufficient strong acid to obtain a pH of about 2-3 to selectively solubilize the interferon or with a chelating agent to selectively bind the heavy metal salt while the interferon remains in solution. Suitable agents are strong mineral or organic acids as perchloric acid, hydrochloric acid, trichloracetic acid and the like or chelating agents such as Versene (i.e., ethylenediaminetetraacetic acid tetra-sodium salt). Hydrochloric acid (0.2 N) can be used with advantage in this step. The suspension obtained then is clarified by centrifuging and the supernate which contains the heavy metal salt in solution as well as the interferon is dialyzed against saline to remove residual heavy metal salt.

The dialyzed solution thus obtained (referred to hereinafter as dialyzed solution I) contains about a 10- to 20-fold concentration of the interferon when employing allantoic fluid-containing-interferon as the starting fluid.

The interferon in dialyzed solution I, if desired, can be further concentrated by repeating the above described precipitation with a heavy metal salt followed by dialysis to provide a 100-fold concentration of the interferon with a 10- to 20-fold purification in dialyzed solution II.

Dialyzed solutions I or II contain a useful concentration of interferon. It can be used, for example, to prevent Newcastle disease virus infection as will be shown hereinafter, or to inhibit tumor formation by Rous Sarcoma virus in the wing web of 1-day old chicks.

The interferon in either dialyzed solutions I or II can be purified further by chromatographing on a carboxylic cation exchange resin by a continuous gradient or preferably a stepwise gradient using aqueous acetate or phosphate buffer as the eluant. Further concentration and purification, if desired, can be obtained by again precipitating the interferon from the eluant by use of a heavy metal salt as described above. A purification factor up to about 2000-fold can thus be attained.

An adsorption column is prepared by passing an aqueous buffer such as acetate or phosphate buffer solution having a pH of about 5.8 to 6.4 through a column of adsorbent until the effluent has a pH of about 5.8 to 6.4. A solution of interferon which can have activity of up to about 25,000 units per ml. and which has been dialyzed against a buffer having a pH of 5.8 to 6.4 and an ionic strength of 0.03-0.08 is added to a column of carboxymethyl cellulose or other suitable weak cationic exchangers such as a carboxylic cation exchange resin. After the addition is complete, additional buffer solution having a pH of 5.8 to 6.4 is passed through the column which removes a considerable amount of protein having no interferon activity.

The concentration of protein in the effluent is measured by the Lowry colorimetric method as described in J. Biol Chem. 193: 265-75 (1951), O. W. Lowry et al., "Protein Measurement with Folin Phenol Reagent."

An additional amount of proteinaceous material having no interferon activity is removed from the adsorbent by slowly passing a buffer solution having a pH of 5.8 to 6.4 with a stepwise increase in ionic strength to about 0.13 through the column until the effluent is substantially protein free. This solution is prepared from a buffer solution having a pH of about 5.8 to 6.4 by the addition of an inorganic salt, preferably sodium chloride.

Substantially purified interferon is removed from the adsorbent by passing through the column a buffer solution having a pH of about 7.4 to 8.8 and an ionic strength of about 0.13 to 0.18.

The resin employed for adsorbing the interferon preferably is a carboxylic cation exchange resin and for the purposes of this invention the resin can be any of the carboxylic type resins which are available. It was found that carboxymethylcellulose (CMC) prepared by the method described by Peterson and Sober, J. Am. Chem. Soc. 78, 756 (1956) is highly effective in providing efficient adsorption and release of the interferon. Other suitable carboxylic cation exchange resins include Amberlite IRC–50 and Amberlite XE–54, both obtainable from Rohm and Haas Company, are Permutit H–70, sold by the Permutit Company, or other available carboxylic cation exchange resins.

The concentrated and highly purified interferon obtained is effective as will be shown below, in interfering with the multiplication of Newcastle disease virus, and is therefore potentially useful in the prevention of Newcastle disease in fowl. In addition it is effective in interfering with the ability of the Rous Sarcoma virus in producing tumor growth or for the purposes described in the papers identified in Table I.

The major portion of residual impurities, if any, in the interferon-containing solution obtained as described above can be removed either by ionophoresis or zone electrophoresis.

The interferon-containing solution obtained following chromatography is further purified by ionophoresis by use of cellulose acetate paper or any other type of paper having a low adsorptive capacity for the interferon. The interferon-containing solution is applied in a narrow zone on cellulose acetate paper or other suitable paper with the ends immersed in electrode vessels containing any buffer solution in the pH range of 4–10 but preferably borate buffer of pH 8.9. An electric current of 0.4 milliampere/cm. (ma./cm.) width of the paper is applied for from 1 to 3 hours. The paper then is cut into narrow strips and the interferon extracted with 0.9% saline solution containing 0.05 N acetic acid or 0.9% saline containing bovine serum albumin and Tween 80.

Alternatively, larger quantities of chromatographed interferon can be purified by zone electrophoresis on a bed or column of Pevikon C–870 (a copolymer of polyvinyl acetate and polyvinyl chloride, obtainable from Stockholm Superfosfat Fabrika A.-B., Stockholm, Sweden), powdered cellulose acetate paper, or any other media having a low adsorptive capacity for the interferon. A concentrated solution containing interferon is applied in a slit made in a preformed bed of Pevikon C–870 or other suitable media with the ends connected through means of filter paper to electrode vessels containing any suitable buffer in the pH range of 4 to 10 but preferably borate buffer, pH 8.9. Five to ten volts per cm. length of bed is applied for from 6 to 18 hours at 0 to 15° C. but preferably maintaining the temperature at 0–5° C. The bed is then sliced into narrow segments which are extracted with 0.9% saline solution containing 0.05 N acetic acid or 0.9% saline solution containing bovine serum albumin and Tween 80.

The flowsheet forming part of this application which illustrates a typical run in which an interferon is concentrated and purified from egg allantoic fluid, will be described in more detail in the following example. The same procedure is used in whole or in part to concentrate interferon from tissue culture filtrate or from any of the systems described in the papers identified in Table I. As mentioned above, it is not necessary to carry out all of the steps described in the examples or in the flowsheet to obtain a highly concentrated and purified interferon that can be used to inhibit virus replication, as the interferon obtained by treating the crude harvest fluid with the protein precipitating agents mentioned above and then co-precipitating the interferon from the supernate with a heavy metal salt by the procedure described above yields a useful concentration of the active principal.

EXAMPLE 1

*Concentration and purification of interferon from allantoic fluid*

*Step 1.*—To 50 liters of egg allantoic fluid harvest containing 256 units of interferon activity per ml. [see footnote 1, appended to Tables II and III for definition of unit] were added 5.5 liters of 1.5 M perchloric acid with rapid stirring at 5° C. After standing 30 minutes, the mixture was centrifuged 30 minutes at 1500 r.p.m. in a refrigerated centrifuge.

This step can be carried out using trichloroacetic acid, sulfosalicylic acid or tetrametaphosphate in place of perchloric acid to obtain similar results.

The allantoic fluid used in this step was prepared by injecting allantoically $10^{4.50}$ $EID_{50}$ of influenza A virus, WS strain, E 5372 (obtainable from the Rockefeller Institute, New York 21, New York, or from Merck and Co., Inc., West Point, Pennsylvania), in a 0.20 ml. inoculum dose into each 9- to 10-day old embryonated hens' eggs, incubating 96 hours at 36–37° C., after which the eggs are chilled and the allantoic fluid containing interferon withdrawn.

Other active or inactive viruses or other agents known to induce the elaboration of interferons in embryonated eggs can be used in place of the particular influenza virus strain mentioned, such as other strains of influenza A, B or C virus, as the $PR^8$ strain of influenza A virus, Melbourne strain of influenza A virus and the like or measles, herpes simplex, vaccinia, Newcastle disease viruses and the like to induce the synthesis of interferon in the allantoic fluid.

*Step 2.*—The supernate (55 liters containing 256 units of interferon activity per ml.) was adjusted to pH 7–8 with sodium hydroxide and 0.4 molar zinc acetate was added with stirring to a final concentration of 20 millimolar. After standing overnight at 5° C. as much supernate was aspirated off as was possible and the remaining zinc precipitate sludge was centrifuged one hour at 1500 r.p.m. in a refrigerated centrifuge. The collected precipitate containing zinc acetate and interferon was stirred with sufficient cold (0–5° C.) 0.2 N HCl to lower the pH to 2–3 to dissolve the precipitate.

The precipitate also can be dissolved using other strong mineral or organic acids or by employing a chelating agent, as Versene.

The solution was clarified by centrifugation at 1500 r.p.m. for one hour in a refrigerated centrifuge. The interferon-containing solution obtained which had been concentrated 20-fold to 2.6 liters, was dialyzed overnight against 10–20 volume of 0.9% sodium chloride to remove the zinc ions and to give a solution containing 3,840 units of interferon activity per ml.

*Step 3.*—The 20-fold, dialyzed concentrate was adjusted to a pH of 7.0–7.2 with sodium hydroxide and 0.4 molar zinc acetate was added with stirring to a concentration of 20 millimolar. After standing 3 hours or more at 5° C., the precipitate was centrifuged one hour at 2,000 r.p.m. The supernate was discarded and the precipitate was dissolved in sufficient cold (0–5° C.) 0.2 N HCl to obtain a pH of 2–3, and then dialyzed overnight against 50–100 volumes of 0.9% sodium chloride to remove the zinc ions. The interferon containing solution (490 ml.) was concentrated to 100-fold with a 10- to 20-fold purification by this procedure, and had 12,800 units of activity per ml.

Similar results are obtainable using any of the aforementioned heavy metal chlorides or heavy metal salts of organic acids especially the cobalt, zinc, calcium, mercury, strontium or barium acetates, glycinates, lactates, propionates or chlorides.

*Step 4.*—The interferon in the solution obtained in Step 3 was further purified by chromatographing on carboxymethyl-cellulose using a stepwise sodium chloride and pH gradient in 0.01 M phosphate buffer as follows:

(a) The 100-fold concentrated interferon (490 ml.) from Step 3 was dialyzed overnight against 30 volumes of 0.01 M sodium phosphate, pH 6.

(b) The dialyzed interferon containing solution was applied to a column of carboxymethylcellulose, 12" x ¾", which had been equilibrated with 0.01 M sodium phosphate, pH 6.

(c) Chromatography was carried out using a stepwise addition to the column of the following buffers:

Buffer:                                           Volume, ml.

0.01 M phosphate, pH 6 _____  250
    0.01 M phosphate, pH 6, 0.05 M NaCl _____  500
    0.01 M phosphate, pH 6, 0.10 M NaCl _____ 2500
    0.01 M phosphate, pH 8, 0.10 M NaCl _____  500

(d) The interferon was eluted with 0.01 M phosphate, pH 8, containing 0.10 M NaCl. The main peak of activity (19,200 units/ml.) was contained in a fraction volume of 120 ml. The other fractions can be rechromatographed in order to concentrate and to purify further the interferon in each of them and to increase the yield.

*Step 5.*—In order to carry out a second chromatography, the above 120 ml. fraction of interferon was concentrated to 8.5 ml. by zinc acetate precipitation as described in Step 3, to give an interferon-containing solution having 153,600 units of activity per ml.

*Step 6.*—The zinc acetate-concentrated fraction of interferon from Step 5 was dialyzed against 100 volumes of 0.01 M phosphate, pH 6, and applied to a column of carboxymethylcellulose, 2" x ½", which had been equilibrated with the same buffer. The second chromatography was carried out by the stepwise addition to the column of the following buffers:

Buffer:                                           Volume, ml.
    0.01 M phosphate, pH 6 _____   10
    0.01 M phosphate, pH 6, 0.05 M NaCl _____   10
    0.01 M phosphate, pH 6, 0.06 M NaCl _____  10
    0.01 M phosphate, pH 6, 0.07 M NaCl _____  10
    0.01 M phosphate, pH 6, 0.08 M NaCl _____  10
    0.01 M phosphate, pH 6, 0.10 M NaCl _____  50
    0.01 M phosphate, pH 8, 0.10 M NaCl _____  50

The interferon was eluted with 0.01 M phosphate, pH 8, containing 0.1 M NaCl, the main peak of activity (76,800 units/ml.) was contained in a fraction volume of 13.5 ml. The other fractions can be rechromatographed in order to further concentrate and purify the interferon in each of them and to increase the yield.

The chromatography described in Steps 4 and 5 can be carried out with other carboxylic cation exchange resins, such as Amberlite IRC–50, Amberlite XE–54, Permutit H–70 or other available carboxylic cation exchange resins to obtain equivalent results in the further concentration and purification of interferon.

*Step 7.*—The active fraction from Step 6 was further concentrated to 4 ml. by zinc precipitation and dialysis as described in Step 3 to give 225,000 units of interferon activity per ml.

*Step 8.*—Interferon was separated from the major portion of residual impurity remaining following Step 7 by pipetting a 0.4 ml. aliquot thereof into a narrow slit made in a 17 cm. by 2 cm. Pevikon C–870 block. One end of the Pevikon block was attached, through filter paper, to a positive electrode and the opposite end of the block was attached, through filter paper, to a negative electrode; each electrode being immersed in 0.03 M sodium borate buffer, adjusted to pH 8.9 with hydrochloric acid. A current of 3 milliamperes (150–170 volts) was passed through the Pevikon block for 7 hours. At the end of the run, the Pevikon block was sliced into 1 cm. or 0.5 cm. sections as indicated in the following table and each section was separately extracted with a solution containing 0.05 N acetic acid and 0.9% sodium chloride and the extracts separately analyzed for protein and interferon activity. The data obtained is given in the following table, wherein the area of the Pevikon block sections are identified; the "+" areas having been sliced from the end of the block attached to the anode, and the "−" areas having been sliced from the end of the block attached to the cathode. The first two positive slices and the last two negative slices were each of 1 cm., the remaining slices being 0.5 cm. each.

TABLE II

| Section Analyzed, cm. from origin | Extractant, ml. used | Interferon Activity [1] | | Protein,[2] mg./ml. | Sp. Act., units/ mg. protein |
|---|---|---|---|---|---|
| | | Units/ml. | Total Activity | | |
| +3   | 4 | 0     | 0     |       |         |
| +2   | 4 | 48    | 192   | .0036 |         |
| +1.5 | 2 | 1,280 | 2,560 | .0072 | 178,000 |
| +1.0 | 2 | 2,560 | 5,120 | .0108 | 236,000 |
| +0.5 | 2 | 1,280 | 2,560 | .0086 | 150,000 |
| −0.5 | 2 | 768   | 1,536 | .028  |         |
| −1.0 | 2 | 256   | 512   | .027  |         |
| −1.5 | 2 | 256   | 512   | .025  |         |
| −2   | 4 | 0     | 0     | .016  |         |
| −3   | 4 | 0     | 0     | .007  |         |

For footnotes see end of Table III.

The degree of concentration and purification of interferon obtained by the various steps of the above procedure is summarized in the following table:

TABLE III

| Fractionation Step | Volume | Interferon Activity,[1] units/ml. | Protein,[2] mg./ml. | Sp Act.,[3] units/mg. protein | Percent Recovery | Purification Factor [4] |
|---|---|---|---|---|---|---|
| Crude Harvest | 50 liters | 256 | 5.0 | 52 | | |
| 1. Supernate from perchloric acid treatment of crude harvest. | 55 liters | 256 | 2.2 | 116 | 100 | 2.25 |
| 2. First zinc precipitation | 2.6 liters | 3,840 | 7.4 | 520 | 75 | 10 |
| 3. Second zinc precipitation | 490 ml | 12,800 | 15.6 | 820 | 50 | 16 |
| 4. First chromatography on CMC | 120 ml | 19,200 | 0.38 | 50,500 | 18 | 970 |
| 5. Concentration of active fraction from column with zinc acetate. | 8.5 ml | 153,600 | 2.7 | 57,000 | 10.2 | 1,100 |
| 6. Second chromatography on CMC | 13.5 ml | 76,800 | 0.85 | 92,000 | 8 | 1,750 |
| 7. Concentration of active fraction with zinc. | 4 ml | 225,000 | 2.38 | 95,000 | 7.2 | 1,830 |
| 8. Final purification on Pevikon C-870. | 20 ml | 2,560 | .0108 | 236,000 | | 4,000 |

[1] The unit of activity reported in these tables is assayed in terms of interference with a Group A Arbo Virus such as Sindbis virus or eastern equine encephalomyelitis (EEE) virus in monolayer cell cultures of the same tissue used when synthesizing the interferon. Serial dilutions of interferon-containing fluid, 1 ml., is added to the cell cultures and incubated at 37° C. for 6 hours. After removing the fluid, each treated cell culture is challenged with 100 TCID$_{50}$ (100 tissue culture infectious doses) of EEE, Sindbis or other Group A Arbo Virus. The unit of interferon is expressed as the reciprocal of the highest dilution of interferon-containing fluid which effects total prevention of cytopathology in the cell culture.
[2] Determined by the method described by O. H. Lowry et al, J. Biol. Chem. 193: 265-75 (1951), "Protein Measurement with Folin Phenol Reagent."
[3] Sp. Act.=Specific Activity.
[4] $\frac{\text{Sp. Act. of test material}}{\text{Sp. Act. of crude harvest}}$ = Purification factor.

The interferon concentrated by the above procedure, Steps 1 through 7, was tested for its effect on Newcastle disease virus (NDV) in one-day old chicks and was found to protect some of the chicks from death caused by the virus and additionally to prolong the survival time of those chicks not fully protected by the interferon. The studies were carried out by two methods; one wherein the interferon was administered in two doses 24 and 6 hours before the chicks were challenged and secondly wherein the interferon was administered in two doses 24 and 6 hours before the chicks were challenged and again daily starting 18–20 hours after virus infection and continuing for the number of times specified in the following table. The designated units of interferon were administered intraperitoneally as a 0.5 ml. inoculant. Newcastle disease virus also was administered intraperitoneally as a 0.5 ml. inoculant containing 5 LD$_{50}$. For comparison the crude harvest, i.e., the interferon-containing allantoic fluid (Step 1) used as the starting material in the novel procedure of this invention, was tested along with the concentrated interferon preparation obtained by the second zinc acetate precipitation step (Step 4). Control birds which received only the challenge dose of 5 LD$_{50}$ doses of NDV in a 0.5 ml. inoculant also were included. The results of this study are reported in the following table.

perchloric acid and employing the crude harvest fluids containing an interferon obtained by any of the methods described in the papers identified in Table I or by other known methods to obtain similar results.

The interferon-containing tissue culture filtrate (TCF) employed in this step was prepared by growing live herpes simplex virus upon tissue cultures of embryonic chick fibroblasts. The tissue culture was prepared from trypsinized chick embryo tissue from 9- to 10-day-old chick embryos, suitably by the method of Dulbecco and Vogt, J. Experimental Medicine, 99 (1954) 167. The trypsinized tissues were grown for 72 hours in Blake bottles at around 36° C. in a suitable fluid growth medium such as Medium 199 containing 1% calf serum (Proc. Soc. Exp. Biol. and Med., 73 (1950) 1). Live herpes simplex virus is inoculated in to fresh growth Medium 199 containing a suitable antibiotic as penicillin, streptomycin or a combination thereof and sufficient inoculum is added to each Blake bottle to give a final volume of 100 ml. of medium containing 3–10 TCID$_{50}$ (tissue culture infectious doses 50) of virus per ml. The Blake bottles then were incubated at 36–37° C. for about 96 hours or until an advanced state of virus growth is reached which can be determined by observing cytopathogenic changes TABLE IV.—MEASUREMENT OF EFFECT OF ADMINISTRATION OF CRUDE AND CONCENTRATED INTERFERON ON NEWCASTLE DISEASE VIRUS IN ONE-DAY OLD CHICKS

| Regimen of Treatment with Interferon | | | | Findings | | | Survival Indices | |
|---|---|---|---|---|---|---|---|---|
| Interferon fraction | Pre-virus | Post-virus | Total units | No. animals surviving/ Total No. animals | Percent Survival | Average survival in days | Excess survival | Excess survival in days |
| Step 1 | 2 x 64 U [1] | | 128 | 3/10 | 30 | 9.9 | 23.3 | 2.2 |
| Step 1 | 2 x 64 U | 5 x 64 U | 448 | 4/15 | 27 | 10.0 | 20.3 | 2.3 |
| Step 4 | 2 x 3,200 U | | 6,400 | 6/10 | 60 | 13.8 | 53.3 | 6.1 |
| Step 4 | 2 x 3,200 U | 5 x 3,200 U | 72,400 | 5/15 | 33 | 10.5 | 26.3 | 2.8 |
| Control | | | | 2/30 | 6.7 | 7.7 | | |

[1] Two doses each containing 64 units interferon.

EXAMPLE 2

*Concentration and purification of interferon from tissue culture fluids (from chick fibroblast culture)*

Step 1.—To 800 ml. of tissue culture fluid containing 48 units of interferon activity per ml. were added 65 ml. of 2 M perchloric acid slowly with stirring at 5° C. After stirring 10–20 minutes, the mixture was centrifuged 30 minutes at 1500 r.p.m. in a refrigerated centrifuge.

This step can be carried out using trichloracetic acid, sulfosalicylic acid or tetrametaphosphate in place of in the tissue culture cells. At the end of this time the tissue culture fluid overlay containing the interferon was harvested by decantation.

Other tissue cultures can be used in place of the chick embryo fibroblast cells such as those described in the papers identified in Table I, as monkey kidney cells, calf kidney, human embryonic lung or kidney cells or other commonly employed tissue culture systems. Similarly other active or inactivated virus or other agent known to induce the synthesis of interferon can be employed as the inoculum, as rubella, mumps, parainfluenza, vaccinia, foot and mouth disease, eastern and western equine encephalomyelitis, Newcastle, polio and the like agents as used in the interferon-inducing systems described in the papers identified in Table I to induce the synthesis of an interferon in the desired tissue culture system.

*Step 2.*—The supernate (850 ml. containing 48 units of interferon activity per ml.) was adjusted to pH 7 with sodium hydroxide and 0.4 molar zinc acetate was added to a final concentration of 10 millimolar. The pH was carefully adjusted to 7.4 by the addition of 2 N sodium hydroxide. After standing overnight at 5° C., as much supernate was aspirated off as was possible and the remaining zinc precipitate sludge was centrifuged 30 minutes at 2000 r.p.m. in a refrigerated centrifuge. The collected zinc precipitate containing interferon was stirred with sufficient cold (0–5° C.) 0.2 N HCl to dissolve the precipitate at a pH of 2–3. The interferon-containing solution obtained which had been concentrated 13 fold to 60 ml., was dialyzed overnight against 50 volumes of 0.9% sodium chloride to remove zinc ions and to give a solution containing 512 units of interferon activity per ml.

Other heavy metal salts can be used in place of the zinc acetate, including the cobalt, zinc, calcium, mercury, strontium or barium acetates, glycinates, lactates, propionates or chlorides, to coprecipitate the interferon.

*Step 3.*—To the dialyzed 13 fold concentrate was added 0.4 M zinc acetate to a concentration of 20 millimolar. The pH was carefully adjusted to 7.4 with 2 N sodium hydroxide. After standing 3 hours or more at 5° C., the second zinc precipitate was centrifuged one hour at 2000 r.p.m. The collected precipitate was dissolved in sufficient cold (0–5° C.) 0.2 N HCl to obtain a pH of 2–3 and the solution then dialyzed overnight against 50–100 volumes of 0.9% sodium chloride to remove zinc ions. The thus obtained interferon solution (12.5 ml.) represents a 64 fold concentrate containing 2,048 units of activity per ml.

*Step 4.*—The above interferon concentrate was purified by chromatography on carboxymethyl cellulose using a stepwise sodium chloride and pH gradient in 0.01 M phosphate buffer as follows:

(a) The 64 fold concentrated interferon (12.5 ml.) from Step 3 was dialyzed overnight against 100 volumes of 0.01 M sodium phosphate, pH 6.

(b) The dialyzed interferon solution was applied to a column of carboxymethyl cellulose, 5″ x ½″, which had been equilibrated with 0.01 M sodium phosphate pH 6.

(c) Chromatography was carried out using a stepwise addition to the column of the following buffers:

Buffer: Volume ml.
0.01 M phosphate, pH 6 _____ 50
0.01 M phosphate, pH 6, 0.05 M NaCl _____ 20
0.01 M phosphate, pH 6, 0.10 M NaCl _____ 90
0.01 M phosphate, pH 8, 0.10 M NaCl _____ 50

(d) The interferon was eluted with 0.01 M phosphate, pH 8, containing 0.1 M NaCl. The main peak of activity (512 units/ml.) was contained in a fraction volume of 10 ml. The other fractions can be rechromatographed in order to concentrate and purify further the interferon in each of them and to increase the yield.

(e) The interferon-containing solution obtained as described above can be concentrated and purified further by the procedures described in Steps 5 through 8 of Example 1. However, analysis of the active substance contained in the 10 ml. fraction of Step 4 established that the interferon, concentrated and purified from tissue culture fluid as described above, has the same physical properties as the interferon obtained from allantoic fluid. These properties are as follows:

Interferon from Allantoic Fluid (Example 1):
 (1) Stable at pH 2–10
 (2) Stable at 56° C. for 1 hour
 (3) Elutes from CM-cellulose at pH 8
 (4) Molecular weight 34,000
 (5) Migrates toward anode at pH 8.9 on cellulose acetate paper
 (6) Destroyed by trypsin Interferon from Tissue Culture Fluid (Example 2):
 (1) Stable at pH 2–10
 (2) Stable at 60° C. for 1 hour
 (3) Elutes from CM-cellulose at pH 8
 (4) Molecular weight 36,000
 (5) Migrates toward anode at pH 8.9 on cellulose acetate paper
 (6) Destroyed by trypsin The CMC used for chromatography in Step 4 of Example 2 can be replaced by other carboxylic cation exchange resins, such as Amberlite IRC–50, Amberlite XE–54, Permutit H–70 or other available carboxylic cation exchange resins to obtain equivalent results in concentrating and purifying interferon.

The degree of concentration and purification of interferon obtained by the various steps of Example 2 is summarized in the following table.

TABLE V.—PURIFICATION OF INTERFERON FROM TISSUE CULTURE FLUID

| Fractionation Step | Volume | Interferon Activity, units/ml. | Mg. Protein per ml. | Sp. Act., units/mg. Protein | Percent Recovery | Purification Factor |
|---|---|---|---|---|---|---|
| 1. Crude Harvest | 800 ml | 48 | 0.77 | 62 | | |
| 2. First zinc precipitation. | 60 ml | 512 | 4.2 | 122 | 80 | 2.0 |
| 3. Second zinc precipitation. | 12.5 ml | 2,048 | 13.9 | 147 | 67 | 2.4 |
| 4. Chromatography on CMC. | 10 | 512 | 0.11 | 4,660 | 13 | 75 |

Assays employed are those identified in Table II and III footnotes.

EXAMPLE 3

*Concentration of interferon from tissue culture fluids (from mouse embryo culture)*

*Step 1.*—To 500 ml. of crude tissue culture fluids containing 32 units of interferon activity per ml. were added 125 ml. of 2 M perchloric acid. The mixture was stirred 20 minutes at 5° C. and then centrifuged 30 minutes at 1500 r.p.m. in a refrigerated centrifuge.

This step can be carried out using other protein precipitating agents such as trichloracetic acid, sulfosalicylic acid, tetrametaphosphate and the like to obtain similar results.

The interferon-containing TCF employed in this step was prepared by growing influenza A' virus in mouse embryo tissue culture. The tissue culture was prepared from trypsinized, mouse embryo tissue from 15–18 day old mouse embryos, suitably by the method of Dulbecco and Vogt, supra. Twenty Blake bottles containing the tissue culture were each seeded with sufficient virus to provide a final volume of 100 ml. of Medium 199 containing 3–10 $TCID_{50}$ of Influenza A' virus per ml. The Blake bottles then were incubated at 37° C. for 72 hours. At the end of this period the TCF overlay was harvested by decantation and found to contain 32 units of interferon activity per ml. when assayed against EEE virus (eastern equine encephalomyelitis virus) by the procedure identified in the footnotes to Tables II and III.

*Step 2.*—The supernate from Step 1 (600 ml. containing the interferon activity) was adjusted to pH 7 with 10% sodium hydroxide and 0.2 M zinc acetate was added to a final concentration of 20 millimolar. The pH was adjusted to 6.8 by the addition of 0.5 N sodium hydroxide and the mixture was allowed to stand overnight at 5° C.

*Step 3.*—The precipitate was collected by centrifugation and dissolved in 4 ml. of cold (0–5° C.) 0.2 N hydrochloric acid. The acid solution (pH 3) was dialyzed overnight against 100 volumes of 0.9% sodium chloride and further dialyzed against 100 volumes phosphate buffered saline pH 7 to give 5 ml. of solution containing 1,537 units of interferon activity per ml. representing a 100 fold concentration of the active material.

EXAMPLE 4

*Concentration of interferon from tissue culture fluids (from rabbit kidney culture)*

To 500 ml. of crude harvest fluid containing interferon obtained by the method described by Isaacs et al., Lancet 2: 324 (1959) by inoculating rabbit-kidney cell cultures with Influenza Type A(MEL) inactivated by irradiation with ultraviolet rays, is added 125 ml. of 10% trichloracetic acid. The mixture is stirred about ½ hour at 15° C. and then centrifuged for ½ hour at 1500 r.p.m. in a refrigerated centrifuge. The supernate is separated and adjusted to pH 7.5 with 10% sodium hydroxide and 0.2 M zinc acetate is added to a final concentration of about 10 millimolar. The pH is again adjusted to 7.0–7.5 by addition of 5% sodium hydroxide and the mixture allowed to stand overnight at 15° C. The precipiate is collected by centrifugation and dissolved in 5 ml. of cold (0–5° C.) 0.2 N hydrochloric acid (final pH 2–3). The acid solution is dialyzed overnight against 100 volumes of 0.9% sodium chloride and further dialyzed against 100 volumes phosphate buffered saline (pH 7) to give about 6 ml. of solution containing highly concentrated (about 100 fold) interferon.

EXAMPLE 5

*Concentration of interferon from tissue culture fluids (from human amnion culture)*

To 250 ml. of crude harvest fluid containing interferon obtained by the method described by Ho and Enders, Proc. Nat. Acad. Sc. 45: 385 (1959) by inoculating human amnion cell culture with polio virus type 2 (RMC) is added 25 ml. of 10% sulfosalicylic acid. The mixture is stirred about ½ hour at 5° C. and then centrifuged for ½ hour at 1500 r.p.m. in a refrigerated centrifuge. The supernate is separated and adjusted to pH 7 with 10% sodium hydroxide and 0.2 M calcium proprionate is added to a final concentration of about 25 millimolar. The pH again is adjusted to 7–7.5 by addition of 5% sodium hydroxide and the mixture allowed to stand overnight at 5° C. The precipitate is collected by centrifugation and dissolved in 2–3 ml. of cold (0–5° C.) 0.2 M hydrochloric acid (final pH 2–3). The acid solution is dialyzed overnight against 100 volumes of 0.9% sodium chloride and further dialyzed against 100 volumes phosphate buffered saline (pH 7) to give about 2–3 ml. of solution containing highly concentrated (about 40 fold) interferon.

EXAMPLE 6

*Concentration of interferon from tissue culture fluids (from mouse fibroblast culture)*

To 500 ml. of crude harvest fluid containing interferon obtained by the method described by Henle et al., J. Exper. Med. 110: 525 (1959) by inoculating mouse fibroblast cell cultures with mumps virus inactivated by irradiation with ultraviolet rays is added 50 ml. of 10% sodium tetrametaphosphate and adjusted to pH 2 with sodium hydrochloric acid. The mixture is stirred about ½ hour at 15° C. and then centrifuged for ½ hour at 1500 r.p.m. in a refrigerated centrifuge. The supernate is separated and adjusted to pH 7 with 10% sodium hydroxide and 0.2 M barium chloride is added to a final concentration of about 10 millimolar. The pH again is adjusted to 7–7.5 by addition of 5% sodium hydroxide and the mixture allowed to stand overnight at 5° C. The precipitate is collected by centrifugation and dissolved in 5 ml. of cold (0–5° C.) perchloric acid (final pH 2–3). The acid solution is dialyzed overnight against 100 volumes of 0.9% sodium chloride and further dialyzed against 100 volumes phosphate buffered saline (pH 7) to give about 5 ml. of solution containing highly concentrated (about 50 fold) interferon.

EXAMPLE 7

*Concentration of interferon from tissue culture fluids (from chick embryo fibroblast culture)*

To 500 ml. of crude harvest fluid containing interferon obtained by the method described by Vileck, Nature (London) 187: 73 (1960) by inoculating chick embryo fibroblast cells with tick-borne encephalitis virus is added 26 ml. of 2 M perchloric acid. The mixture is stirred about ½ hour at 5° C. and then contrifuged for ½ hour at 1500 r.p.m. in a refrigerated centrifuge. The supernate is separated and adjusted to pH 7 with 10% hydroxide and 0.2 M calcium glycinate is added to a final concentration of about 10 millimolar. The pH again is adjusted to 7–7.5 by addition of 5% sodium hydroxide and the mixture allowed to stand overnight at 5° C. The precipitate is collected by centrifugation and dissolved in 5 ml. of cold (0–5° C.) trichloracetic acid (final pH 2–3). The acid solution is dialyzed overnight against 100 volumes of 0.9% sodium chloride and further dialyzed against 100 volumes phosphate buffered saline (pH 7) to give about 5 ml. of solution containing highly concentrated (about 100 fold) interferon.

EXAMPLE 8

*Concentration of interferon from tissue culture fluids (from human amnion cell culture)*

To 500 ml. of crude harvest fluid containing interferon obtained by the method described by DeMaeyer et al., Proc. Soc. Exper. Biol. and Med., 107:573 (1961) by inoculating human amnion cell cultures with measles virus is added 50 ml. of 10% trichloracetic acid. The mixture is stirred about ½ hour at 3° C. and then centrifuged for ½ hour at 1500 r.p.m. in a refrigerated centrifuge. The supernate is separated and adjusted to pH 7 with 10% sodium hydroxide and 0.2 M strontium chloride is added to a final concentration of about 10 millimolar. The pH again is adjusted to 7–7.5 by addition of 5% sodium hydroxide and the mixture allowed to stand overnight at 5° C. The precipitate is collected by centrifugation and dissolved in 5 ml. of cold (0–5° C.) 0.25 M Versene (ethylenediaminetetraacetic acid tetrasodium salt) (adjusted to pH 2–3). The solution is dialyzed overnight against 100 volumes of 0.9% sodium chloride and further dialyzed against 100 volumes phosphate buffered saline (pH 7) to give about 5 ml. of solution containing highly concentrated (about 50 fold) interferon.

EXAMPLE 9

*Concentration of Interferon from Tissue Culture Fluids (from mouse fibroblast cell culture)*

To 500 ml. of crude harvest fluid containing interferon obtained by the method described by Allison, Virology 15: 47 (1961), by inoculating mouse fibroblast cell cultures with polyoma virus is added 26 ml. of 2 M perchloric acid. The mixture is stirred about ½ hour at 5° C. and then centrifuged for ½ hour at 1500 r.p.m. in a refrigerated centrifuge. The supernate is separated and adjusted to pH 7 with 10% sodium hydroxide and 0.2 M zinc acetate is added to a final concentration of about 20 millimolar. The pH again is adjusted to 7—7.5 by addition of 5% sodium hydroxide and the mixture allowed to stand overnight at 5° C. The precipitate is collected by centrifugation and dissolved in 5 ml. of cold (0–5° C.) hydrochloric acid (final pH 2–3). The acid solution is dialyzed overnight against 100 volumes of 0.9 % sodium chloride and further dialyzed against 100 volumes phosphate buffered saline (ph 7) to give about 5 ml. of solution containing highly concentrated (about 100 fold) interferon.

EXAMPLE 10

*Concentration of Interferon from Tissue Culture Fluids (from monkey kidney cell culture)*

To 500 ml. of crude harvest fluid containing interferon obtained by the method described by Hsiung, Proc. Soc. Exper. Biol. and Med., 108: 357 (1962) by inoculating monkey kidney cell cultures with heat inactivated DA myxovirus is added 26 ml. of 10% trichloracetic acid. The mixture is stirred about ½ hour at 5° C. and then centrifuged for ½ hour at 1500 r.p.m. in a refrigerated centrifuge. The supernate is separated and adjusted to pH 7 with 10% sodium hydroxide and 0.2 M zinc acetate is added to a final concentration of about 30 millimolar. The pH again is adjusted to 7–7.5 by addition of 5% sodium hydroxide and the mixture allowed to stand overnight at 5° C. The precipitate is collected by centrifugation and dissolved in 5 ml. of cold (0–5° C.) hydrochloric acid (final pH 2–3). The acid solution is dialyzed overnight against 100 volumes of 0.9% sodium chloride and further dialyzed against 100 volumes phosphate buffered saline (pH 7) to give about 5 ml. of solution containing highly concentrated (about 100 fold) interferon.

EXAMPLE 11

*Concentration of Interferon from Tissue Culture Fluids (from chick embryo cell culture)*

To 500 ml. of crude harvest fluid containing interferon obtained by the method described by Lennette et al., J. Exp. Med., 83: 195 (1946) by inoculating yellow fever virus, 17 DD High Strain, into chick embryo cell cultures is added 50 ml. of trichloracetic acid. The mixture is stirred about ½ hour at 5° C. and then centrifuged for ½ hour at 1500 r.p.m. in a refrigerated centrifuge. The supernate is separated and adjusted to pH 7 with 10% sodium hydroxide and 0.2 M zinc acetate is added to a final concentration of about 5 millimolar. The pH again is adjusted to 7–7.5 by addition of 5% sodium hydroxide and the mixture allowed to stand overnight at 5° C. The precipitate is collected by centrifugation and dissolved in 5 ml. of cold (0–5° C.) hydrochloric acid (final pH 2–3). The acid solution is dialyzed overnight against 100 volumes of 0.9% sodium chloride and further dialyzed against 100 volumes phosphate buffered saline (pH 7) to give about 5 ml. of solution containing highly concentrated (about 50 fold) interferon.

While the invention has been described by the use of certain specific concentrating agents and certain specific conditions for further purifying interferons the invention includes the use of equivalent agents and conditions falling within the scope of the appended claims.

What is claimed is:

1. A process for concentrating interferons from a fluid medium into which interferon has been elaborated by cells in contact with interferon inducing agents comprising adding to said fluid medium maintained at a temperature between 0 to 30° C. a protein precipitating agent selected from the group consisting of perchloric acid, trichloracetic acid, sulfosalicylic acid and tetrametaphosphate to a final concentration of 1–3% of said interferon-containing fluid, adjusting the supernate to pH 6–8 and then adding a heavy metal salt selected from the group consisting of cobalt, zinc, calcium, mercury, strontium and barium salts of acetic acid, glycine, lactic acid, propionic acid and hydrochloric acid to coprecipitate the interferon.

2. A process as claimed in claim 1, wherein the interferon is separated from the heavy metal salt coprecipitant by adjusting the pH to between about 2 to 3.

3. A process as claimed in claim 1, wherein the interferon is separated from the heavy metal salt coprecipitant by addition of ethylenediaminetetraacetic acid tetrasodium salt.

4. A process for concentrating interferons from a fluid medium into which interferon has been elaborated by cells in contact with interferon inducing agents comprising adding to said fluid medium maintained at a temperature between 0 to 30° C., perchloric acid to a final concentration of between 1–3% of said interferon-containing fluid, adjusting the supernate to between pH 6–8 and then adding zinc acetate to coprecipitate the interferon.

5. A process as claimed in claim 4, wherein the precipitate containing zinc acetate and interferon is taken up into solution at pH between about 2 to 3 and then dialyzed to remove the zinc acetate.

6. A process for concentrating an interferon prepared by injecting, allantoically, an inoculum dose of influenza virus into 9 to 12 day-old embryonated avian eggs, incubating at least 72 hours at 36–37° C., chilling the eggs and withdrawing the allantoic fluid containing the induced interferon, comprising adding to said fluid at a temperature maintained between 0 to 30° C. a protein precipitating agent selected from the group consisting of perchloric acid, trichloracetic acid, sulfosalicylic acid and tetrametaphosphate to a final concentration of 1–3% of the interferon-containing allantoic fluid, adjusting the supernate to pH 6–8 and then adding a heavy metal salt selected from the group consisting of cobalt, zinc, calcium, mercury, strontium and barium salts of acetic acid, glycine, lactic acid, propionic acid and hydrochloric acid to coprecipitate the interferon.

7. A process for concentrating interferon prepared by injecting, allantoically, an inoculum dose of influenza virus into 9 to 12 day-old embryonated avian eggs, incubating at least 72 hours at 36–37° C., chilling the eggs and withdrawing the allantoic fluid containing interferon, comprising adding to the interferon-containing allantoic fluid, maintained at a temperature between 0 to 30° C. perchloric acid to a final concentration of between about 1–3%, adjusting the supernate to between about pH 6–8 and then adding zinc acetate to coprecipitate the interferon.

8. A process as claimed in claim 7, wherein the precipitate containing zinc acetate and interferon is taken up in solution at about pH 2–3 and then dialyzed to remove zinc acetate.

9. A process for concentrating interferon from tissue culture fluid into which interferon has been elaborated by cells in contact with interferon inducing agents, comprising adding to said fluid maintained at a temperature between 0 to 30° C. a protein precipitating agent selected from the group consisting of perchloric acid, trichloracetic acid, sulfosalicylic acid and tetrametaphosphate to a final concentration of 1–3% of said interferon-containing fluid, adjusting the supernate to pH 6–8 and then adding a heavy metal salt selected from the group consisting of cobalt, zinc, calcium, mercury, strontium and barium salts of acetic acid, glycine, lactic acid, propionic acid and hydrochloric acid to coprecipitate the interferon.

10. A process as claimed in claim 9, wherein perchloric acid is employed as the protein precipitating agent, and zinc acetate is employed to coprecipitate the interferon.

11. A process as claimed in claim 10, wherein the precipitate containing zinc acetate and interferon is taken up in solution at about pH 2–3 and then dialyzed to remove the zinc acetate component.

12. A process as claimed in claim 1, comprising taking the coprecipitate of heavy metal salt and interferon into solution at about pH 2–3, dialyzing the coprecipitate to remove the heavy metal salt, buffering the interferon-containing solution to between about pH 5.8–6.4 and an ionic strength between about 0.03–0.08, adding the solution to a carboxylic cation exchange resin adsorbent equilibrated to between about pH 5.8–6.4, removing inactive material by passing over the resin adsorbent a buffer having between about pH 5.8–6.4, a stepwise increase in ionic strength from between about 0.03–0.08 to about 0.13 and then desorbing interferon by passing over the resin adsorbent a buffer having between about pH 7.4–8.8 and an ionic strength of between about 0.13–0.18.

13. A process as claimed in claim 12, wherein the elution of inactive and active material from the carboxylic cation exchange resin adsorbent is done by a stepwise ionic strength and pH gradient in a buffer selected from the group consisting of acetate and phosphate buffer.

14. A process as claimed in claim 12, wherein the interferon component in the fluid obtained is separated from the major portion of residual impurities by zone electroporesis at temperatures below room temperature.

15. A process for concentrating and purifying interferon prepared by injecting, allantoically, an inoculum dose of influenza virus into 9 to 12 day-old embryonated avian eggs, incubating at least 72 hours at 36–37° C., chilling the eggs and withdrawing the allantoic fluid containing interferon, comprising adding to said interferon-containing fluid maintained at a temperature betfeen 0 to 30° C., perchloric acid to a final concentration of between about 1–3%, adjusting the supernate to between about pH 6–8 and then adding zinc acetate to coprecipitate interferon, taking the precipitate into solution at pH between about 2 and 3 and then dialyzing the interferon against a buffer having a pH of about 6 and an ionic strength of between about 0.03–0.08 to remove the zinc acetate, adding a phosphate buffer pH 6 to the interferon-containing solution, adding the solution to a carboxymethylcellulose column equilibrated to about pH 6, removing inactive substance by stepwise passing over the column phospate buffer, pH 6, with ionic strength of 0.03, then phosphate buffer, pH 6, with ionic strength of 0.08, then phosphate buffer, pH 6, with ionic strength 0.13 and then eluting the interferon with phosphate buffer, pH 8, and ionic strength of 0.13.

16. A process as claimed in claim 15, wherein the interferon component in the fluid obtained is separated from the major portion of residual impurities by zone electrophoresis on a copolymer of polyvinylacetate and polyvinyl chloride at a temperature below room temperature and employing from about 5 to about 10 volts per cm. length of bed.

No references cited.

LEWIS GOTTS, *Primary Examiner.*